United States Patent [19]

Cussler

[11] Patent Number: 4,555,344

[45] Date of Patent: Nov. 26, 1985

[54] METHOD OF SIZE-SELECTIVE EXTRACTION FROM SOLUTIONS

[75] Inventor: Edward L. Cussler, Edina, Minn.

[73] Assignee: Regents of the University of Minnesota, Minneapolis, Minn.

[21] Appl. No.: 526,275

[22] Filed: Aug. 25, 1983

[51] Int. Cl.[4] .................... B01D 15/06; B01D 15/08
[52] U.S. Cl. .................................. 210/670; 210/689
[58] Field of Search ............... 210/634, 635, 642, 644, 210/648, 734, 673, 674, 689, 670

[56] References Cited

U.S. PATENT DOCUMENTS

| | | | |
|---|---|---|---|
| 3,386,912 | 6/1968 | Lazare | 210/648 X |
| 3,658,745 | 4/1972 | Merrill et al. | 210/689 X |
| 3,721,621 | 3/1973 | Hough | 210/648 X |
| 3,817,379 | 6/1974 | Zipilivan et al. | 210/94 |
| 3,925,017 | 12/1975 | Updike | 210/635 X |
| 3,968,093 | 7/1976 | Hasegawa et al. | 210/734 |

Primary Examiner—Richard V. Fisher
Assistant Examiner—W. Gary Jones
Attorney, Agent, or Firm—Burd, Bartz & Gutenkauf

[57] ABSTRACT

A separation method utilizing the ability of cross-linked ionic polymer gels to selectively extract solvent from a solution of a macromolecular material. A feed solution containing macromolecules is added to a small amount of basic or warm gel. The gel swells, absorbing the low molecular weight solvent, but cannot absorb the large macromolecules. The raffinate, which is now a concentrated macromolecular solution, is drawn off. To regenerate, a little acid is added to the filtered gel, or the gel is cooled, so its volume decreases sharply. The solvent is expelled from the shrinking gel and is then drawn off, leaving only the collapsed gel. A base is added to the gel, or the gel is warmed. More feed solution is added, and the cycle is begun again.

10 Claims, 1 Drawing Figure

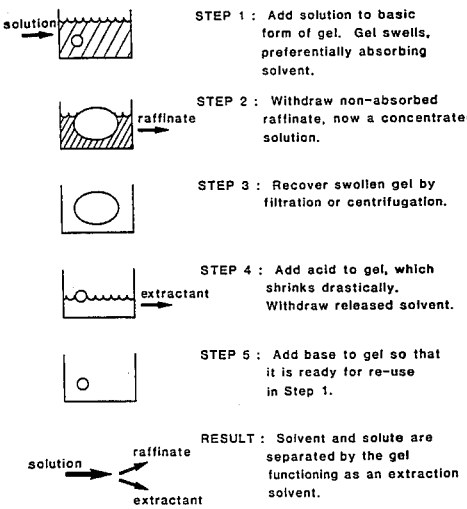

STEP 1: Add solution to basic form of gel. Gel swells, preferentially absorbing solvent.

 STEP 2: Withdraw non-absorbed raffinate, now a concentrated solution.

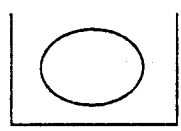 STEP 3: Recover swollen gel by filtration or centrifugation.

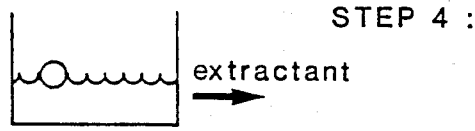 STEP 4: Add acid to gel, which shrinks drastically. Withdraw released solvent.

 STEP 5: Add base to gel so that it is ready for re-use in Step 1.

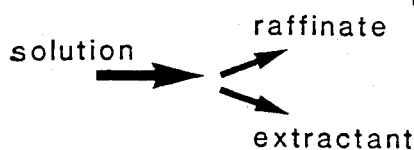 RESULT: Solvent and solute are separated by the gel functioning as an extraction solvent.

METHOD OF SIZE-SELECTIVE EXTRACTION FROM SOLUTIONS

BACKGROUND OF THE INVENTION

1. Field of the Invention

This invention relates to a method of selectively extracting low molecular weight solvents to concentrate higher molecular weight solutes in solution therein by the use of cross-linked ionic gels. Cross-linked ionic gels have been developed as size selective extraction solvents. Such gels absorb low molecular weight solvents, such as water, but not high molecular weight solutes, such as proteins. The high molecular weight solute is recovered as a concentrated solution. The gels are easily regenerated for reuse be a change in pH, composition and/or temperature of the surrounding liquid.

Separation processes are a key aspect of the chemical industry. In the past, these processes were dominated by distillation, reflecting the key role played by petroleum. Other important separations include gas scrubbing, liquid-liquid extraction, crystallization and filtration. However, there are an emerging group of separation problems for which current technology is expensive and energy intensive. These problems center around dilute solutions or organic or biological materials. Examples include the removal of water from dilute solutions like cheese whey, the concentration of antibiotics in fermentation beers, and the recovery of protein products of genetically-engineered microorganisms.

2. Prior Art

The basic idea of using gels as size-selective extraction solvents which can be regenerated by phase transitions seem to be new and no relevant prior art is known. However, the use of gels for separations is not new, and the study of phase transitions in gels is well established.

Separations using gels are usually based on gel permeation chromatography (GPC). The basic apparatus used in this method consists of a packed bed of gel spheres of the same size. The spheres are swollen with solvent to a constant extent. Solvent flows steadily through this bed. At time zero, a pulse of solution containing several high molecular weight solutes is injected at the top of the bed. As the pulse is swept down the column, different solutes are retained by the gel to different degrees. Basically, small solutes which can diffuse quickly into the gel are retarded the most, and large solutes which are excluded from the gel are swept along fastest. Thus the largest solutes are eluted most quickly, and the smallest solutes come out of the column last. The differential retention by any single gel sphere is very slight, but the total retention for all the spheres in the bed can effectively separate the solutes.

In the GPC separation, the separation is of very small amounts of similar high molecular weight solutes in a packed bed of gel swollen to a constant extent. Changes in swelling ruin the separation. In this invention, the separation is of potentially large amounts of a high molecular weight solute and a small solvent using a gel whose swelling is deliberately altered. Changes in swelling are central to regeneration and reuse.

Some separations using commercial gels are based on gel absorption, with resulting volume changes. These commercial gels absorb organic molecules. They are hard to regenerate.

The separation closest to producing the results of the present invention is ultrafiltration. For that process, water and small molecular weight solutes are forced under high pressure through a size selective membrane, while larger molecular weight solutes are retained as concentrates. The membranes can be used for many separations and can be cleaned by reversing the flow of solvent. However, initial membrane cost is high and the application of pressure is energy costly.

SUMMARY OF THE INVENTION

Broadly stated, the invention resides in the method of selectively extracting low molecular weight solvents from solutions of higher molecular weight solutes, which invention comprises admixing the solution with a cross-linked ionic gel. The ionic gel has the capability of swelling by absorbing a portion of the solvent. After this absorption, the resulting remaining concentrated solution, called the "raffinate", is separated from the swollen gel. The gel is regenerated for reuse by lowering its pH, adding another solvent and/or altering the temperature. The swollen gel releases its absorbed solvent and returns to its normal less-swollen condition. The freed solvent is separated and the gel is prepared for absorption of further solvent by raising its pH, adding another solvent and/or by reversing the temperature change. The raffinate may be further concentrated by further treatment with the gel.

BRIEF DESCRIPTION OF THE DRAWING

The invention is illustrated by the drawing in which the FIGURE is a schematic representation in flow sheet form showing the successive steps in preferential absorption of solvent by gel and regeneration of the gel.

DETAILED DESCRIPTION OF THE PREFERRED EMBODIMENT

The invention is based on the use of cross-linked gels as size selective extraction solvents. The gels are effective because they absorb a low molecular weight solvent like water, but not high molecular weight solutes like proteins. They can be easily regenerated because their swelling is a very strong function of the pH, composition and/or temperature of the surrounding solution. As a result, these gels represent an attractive new separation process.

The way in which the gels function is shown schematically in the drawing. Small gel spheres are added to a dilute solution. The spheres swell, absorbing the low molecular weight solvent but excluding high molecular weight solutes. The raffinate, now concentrated in the high molecular weight solutes, can then be separated from the swollen gel, as by filtration.

For economic utilization, the swollen gel must now be regenerated. When using gels whose swelling is a very strong function of pH, adding acid collapses the gel volume and releases much of the absorbed solvent. The collapsed gel is separated from the released solvent by filtration and added to a small amount of base. The gel can then be added to fresh solution, where it will swell again.

The regeneration depends on large changes of gel volume with small changes in process conditions like temperature, composition and pH. At low pH, the gel volume is constant; over some intermediate pH range, it increases sharply. It has been demonstrated that the sudden increase in volume occurs at pH 5-6 for partially hydrolyzed acrylamide gel and at pH 2-3 for dextran gel. For a separation to be effective, the sudden increase in gel volume must occur at a lower pH than that of the solution being separated. However, the separations need not involve changing the pH of the solution. The gel can be added to the solution and removed from it at the solution's pH. It is only the gel regeneration which involves adding acid or base, and not the separation itself.

An advantage of the process of this invention over other concentration techniques is that during the process, both small molecular weight solutes and water are removed, in proportion to their concentrations. Therefore, the ionic environment of the medium does not change, making the method ideal for labile products, such as: proteins (including enzymes), antibiotics, high molecular weight polysaccharides, microbial cells and other fermentation products. This feature is shared with ultrafiltration, which is expensive and slow.

For economical considerations, the gel to be used for a separation will undergo the volume change at a pH close to that of the $pK_a$ of the solute to be concentrated or the pH of the initial solution. For example, polyacrylamide has a transition point of 5–6, close enough to the neutral $pK_a$ of many proteins, so that little acid is necessary to regenerate the gel. Thus, polyacrylamide is the gel of choice for these separations.

The polymerization conditions of the gel can be manipulated to change the maximum diameter for permeation, thus setting a lower size limit on excluded solutes. The lower size limit is about 10 Å.

Although the invention is described with particular reference to partially hydrolyzed polyacrylamide (Bio-Gel P-6) and dextran (CM-Sephadex C-50), the method works with any polymer (gel) that undergoes a rapid volume change in response to a change in pH, composition or temperature. The first would include any ionizable polymer, or any that can be treated in some way to make it ionizable. Polyacrylamide, polyethylamine, and a co-polymer of diethylacrylamide and sodium methacrylate have been used. Other exemplary materials include polymers and co-polymers of: acrylic acid; methylacrylic acid; methylacrylamine; derivatized polystyrene; derivatized cellulose, as carboxymethyl cellulose; derivatized dextrans other than carboxymethyl Sephadex; peptidoglycans; and the like.

The invention is further illustrated by the following Examples:

One gel was made by partially hydrolyzing cross-linked polyacrylamide beads produced commercially as packing for gel permeation chromatography (Bio-Rad Laboratories, Richmond, CA). This material, sold as Bio-Gel P-6 (50–100 mesh), has a particle size in water of 150–300:$10^{-6}$ m. It was hydrolyzed for 24 hours at 50° C. in 0.5M NaHCO$_3$. Another gel (CM-Sephadex C-50), Pharmacia Fine Chemicals, Piscataway, N.J.), is also made as a packing for gel permeation chromatography. The material, which has a dry particle size of 60–120×$10^{-6}$ m, is already weakly ionic, and so was used as received. The solutes involved are all neutral or negatively charged.

The basic apparatus used in the measurements consists of a centrifuge tube with two compartments, separated by a hydrophobic filter (Whatman, PS). For each experiment, about 5 g of gel and 20 g of the basic solution to be separated were placed in the upper compartment. The compartment was mixed on a wrist action shaker, and then the tube was centrifuged for 5 minutes at 1000 rpm. Both the gel and the raffinate were removed and analyzed. The gel was regenerated by washing with a small volume 0.1N HCl.

Gel Selectivity. That the gel can function as a size-selective extraction solvent is shown by the experiments reported in Table I. The first three columns in the Table give the sizes of the solutes to be concentrated. Columns 4–5 give the initial and final concentrations of the solution; in other words, they give the increases in concentration achieved with the small amount of gel used. Finally, the last column in Table I gives the efficiency of the extraction, expressed as the measured concentration change compared with that expected from the altered raffinate volume. For example, if the solution volume was reduced by a factor of two, and the solute concentration was increased by a factor of 1.8, then the efficiency would be (1.8/2.0), or 90%.

The results in Table I show that solutes which are greater than 30 Å in diameter can be concentrated with an efficiency of at least 80%. These efficiencies are compromised by weak solute adsorption on the surface of the gel spheres. For example, for the 346 Å latex, some latex adhered weakly to the gel. When this latex was removed by washing, the extraction efficiency increased to 97%. This gel has also removed water from milk and from orange juice.

Gel Regeneration. To be used for separations, gels must both absorb selectively and be regenerated. It has also been shown that the gels used are easily regenerated. Regeneration depends on large changes of gel volume with small changes in process conditions. For the two gels in Table I, the gel volume is constant at low pH; over some intermediate pH range, it increases sharply.

TABLE I

Concentration of Dilute Aqueous Solutions Using Partially Hydrolyzed Polyacrylamide Gels

| Solute | Molecular Weight | Solute Size, Å | Feed Concentration[a] | Raffinate Concentration[a] | Percent Efficiency[b] |
|---|---|---|---|---|---|
| Polystyrene Latex | — | 9900[c] | 0.21 | 0.35 | 85 |
| Polystyrene Latex | — | 346[c] | 0.91 | 1.40 | 82 |
|  |  |  | 0.50[f] | 1.23[f] | 93[f] |
| Silica | — | 50[c] | 1.82 | 3.03 | 80 |
| Bovine Serum Albumin | 66,000 | 72[d] | .08$_2$ | .18$_3$ | 93 |
| Hemoglobin | 64,500 | 62[d] | 0.73 | 1.26 | 91 |
| Polyethylene Glycol | 3000–3700 | 38[e] | 0.56 | 1.09 | 91 |
| Sucrose | 342 | 8.4[d] | 1.00 | 1.09 | 6 |
| Urea | 60 | 5.3[d] | 3.00 | 3.00 | 0 |

[a] As weight percent.
[b] Defined as (measured increase in concentration) × (raffinate volume)/(initial solution volume).
[c] Measured by electron microscopy.
[d] Estimated from the diffusion coefficient in water using the Stokes-Einstein equation.
[e] Reported by the manufacturer from light scattering.
[f] Obtained with a dextran gel (Sephadex C-50).

A sudden increase in volume occurs at pH 5–6 for the hydrolyzed acrylamide gel and at pH 2–3 for the dextran gel, showing that the gels are easily regenerated.

Gel Reuse. To test the repeated use of the gels, a dilute suspension of the 346 Å polystyrene latex described above was prepared. A fraction of the water in this latex was removed using a small amount of the dextran gel, and the raffinate concentration was then measured. The procedure was repeated through ten cycles. From a mass balance, it is expected that this raffinate concentration c after n cycles should be $$c = \frac{m}{V_o - nV}$$

where m is the initial mass of latex, $V_o$ is the initial volume of solution, and V is the volume removed by one cycle of gel absorption. Thus the reciprocal of concentration c should vary linearly with the number of cycles n.

The results show that this is true. These results have two important corollaries. First, there is apparently little cumulative loss due to adsorption of this gel. This adsorption, which is responsible for the inefficiencies reported in Table I, is apparently significant only for the first cycle, and is much less important as the gel is reused. The second corollary of the results is that the gel is removing the same amount of water on the tenth cycle as on the first cycle. This implies that the gel is remaining intact over all cycles, and hence can be routinely reused.

It is apparent that many modifications and variations of this invention as hereinbefore set forth may be made without departing from the spirit and scope thereof. The specific embodiments described are given by way of example only, and the invention is limited only by the terms of the appended claims.

I claim:

1. A method of selectively extracting low molecular weight solvents from solutions of higher molecular weight solutes which comprises:
    (A) admixing a solution of a high molecular weight solute in a low molecular weight solvent with either a cross-linked partially hydrolyzed ionic polymer gel or an ionic dextran gel, both gels capable of undergoing a rapid change in volume in response to change in pH,
    (B) extracting a portion of the solvent from the solution by rapid swelling of the gel by selective absorption of the solvent under preselected pH conditions, thereby concentrating the solution,
    (C) after absorption of a portion of the solvent by the gel, separating the concentrated solution from the swollen gel,
    (D) after separation of the concentrated solution from the swollen gel, subjecting the gel to a change in pH whereby the gel shrinks to a reduced volume to release most of the absorbed solvent, and
    (E) separating the solvent from the reduced volume gel.

2. A method according to claim 1 wherein the high molecular weight solute has a diameter of at least about 10 Å.

3. A method according to claim 1 wherein the gel is one which undergoes a significant volume change at a pH close to that of the $pK_a$ of the solute to be concentrated.

4. A method according to claim 1 wherein the gel is one which undergoes a significant volume change at a pH close to the initial pH of the solution.

5. A method according to claim 1 wherein said gel is partially hydrolyzed polyacrylamide.

6. A method according to claim 1 wherein the pH is lowered by addition of an acid to the gel.

7. A method according to claim 6 wherein the gel is regenerated for reuse by addition of a base to the gel.

8. A method according to claim 1 wherein the concentrated solution is further concentrated by:
    (A) admixing the concentrated solution with additional amounts of said gel,
    (B) extracting an additional portion of the solvent from the solution by rapid swelling of the additional gel by selective absorption of the solvent, and
    (C) after further absorption of a portion of the solution by the gel, separating the further concentrated solution from the swollen gel.

9. A method of selectively extracting low molecular weight solvent from solutions of higher molecular weight solutes which comprises:
    (A) admixing a solution of a high molecular weight solute in a low molecular weight first solvent with either a cross-linked partially hydrolyzed ionic polymer gel or an ionic dextran gel, both gels capable of undergoing a rapid change in volume in response to change in composition of the solution,
    (B) extracting a portion of the first solvent from the solution by rapid swelling of the gel by selective absorption of the solvent by addition of another different solvent to the solution, thereby concentrating the solution, and
    (C) after absorption of a portion of the first solvent by the gel, separating the concentrated solution from the swollen gel.

10. A method according to claim 9 wherein the concentrated solution is further concentrated by:
    (A) admixing the concentrated solution with additional amounts of said gel,
    (B) extracting an additional portion of the first solvent from the solution by rapid swelling of the additional gel by selective absorption of the first solvent, and
    (C) after further absorption of a portion of the solution by the gel, separating the further concentrated solution from the swollen gel.

* * * * *

UNITED STATES PATENT AND TRADEMARK OFFICE
CERTIFICATE OF CORRECTION

PATENT NO. : 4,555,344
DATED : November 26, 1985
INVENTOR(S) : Edward L. Cussler It is certified that error appears in the above-identified patent and that said Letters Patent is hereby corrected as shown below:

Column 1, line 16, "be" should be --by--.

Signed and Sealed this

Eighth Day of July 1986

[SEAL]

Attest:

DONALD J. QUIGG

Attesting Officer

Commissioner of Patents and Trademarks

UNITED STATES PATENT AND TRADEMARK OFFICE
CERTIFICATE OF CORRECTION

PATENT NO. : 4,555,344

DATED : November 26, 1985

INVENTOR(S) : EDWARD L. CUSSLER

It is certified that error appears in the above-identified patent and that said Letters Patent is hereby corrected as shown below:

COLUMN 1, LINE 4

The following acknowledgment should be inserted in the heading:

--- This invention was made with government support under CPE 8207017 and CPE 802530 awarded by the National Science Foundation. The government has certain rights in the invention. ---.

Signed and Sealed this

Fourth Day of October, 1994

Attest:

BRUCE LEHMAN

Attesting Officer

Commissioner of Patents and Trademarks